Nov. 18, 1941.  G. H. AKLIN  2,262,985

LENS

Filed May 17, 1940  2 Sheets-Sheet 1

F = 100 mm.  f/1.9

| LENS | GLASS | | RADII | SPACINGS |
|---|---|---|---|---|
| I | $N_D$ = 1.611 | $\nu$ = 57.2 | $R_1$ = + 53.7 mm | $t_1$ = 9.6mm |
| II | = 1.525 | = 51.3 | $R_2$ = ∞ | $t_2$ = 3.2 |
| | | | $R_3$ = +150.3 | $S_1$ = .9 |
| III | = 1.611 | = 58.8 | $R_4$ = + 42.6 | $t_3$ = 9.5 |
| IV | = 1.575 | = 41.4 | $R_5$ = ∞ | $t_4$ = 3.7 |
| | | | $R_6$ = + 26.0 | $S_2$ = 17.4 |
| V | = 1.575 | = 41.4 | $R_7$ = − 27.4 | $t_5$ = 3.6 |
| VI | = 1.620 | = 60.4 | $R_8$ = + 214.2 | $t_6$ = 9.1 |
| | | | $R_9$ = − 36.4 | $S_3$ = 4.0 |
| VII | = 1.620 | = 60.4 | $R_{10}$ = +286.2 | $t_7$ = 7.8 |
| | | | $R_{11}$ = − 87.2 | |

GEORGE H. AKLIN
INVENTOR

BY

ATTORNEY

Nov. 18, 1941.  G. H. AKLIN  2,262,985
LENS
Filed May 17, 1940  2 Sheets—Sheet 2

F = 100 mm  f/1.9

| LENS | GLASS | | RADII | SPACINGS |
|---|---|---|---|---|
| I | $N_D$ = 1.617 | $\nu$ = 55.0 | $R_1$ = + 58.3 mm | $t_1$ = 5.4 mm |
| II | = 1.500 | = 61.8 | $R_2$ = + 103.2 | $t_2$ = 4.5 |
|   |   |   | $R_3$ = + 345.0 | $S_1$ = .4 |
| III | = 1.620 | = 60.4 | $R_4$ = + 44.0 | $t_3$ = 10.9 |
| IV | = 1.563 | = 42.9 | $R_5$ = ∞ | $t_4$ = 3.7 |
|   |   |   | $R_6$ = + 24.7 | $S_2$ = 17.3 |
| V | = 1.605 | = 38.2 | $R_7$ = − 25.7 | $t_5$ = 3.6 |
| VI | = 1.639 | = 55.5 | $R_8$ = + 320.4 | $t_6$ = 12.1 |
|   |   |   | $R_9$ = − 38.2 | $S_3$ = .4 |
| VII | = 1.620 | = 60.4 | $R_{10}$ = ∞ | $t_7$ = 7.8 |
|   |   |   | $R_{11}$ = − 57.3 |   |

GEORGE H. AKLIN
INVENTOR

BY

ATTORNEY

Patented Nov. 18, 1941

2,262,985

UNITED STATES PATENT OFFICE 2,262,985

LENS

George H. Aklin, Rochester, N. Y., assignor to Eastman Kodak Company, Rochester, N. Y., a corporation of New Jersey Application May 17, 1940, Serial No. 335,783

7 Claims. (Cl. 88—57)

This invention relates to lenses and particularly to high aperture photographic objectives.

It is an object of the invention to provide a high aperture objective with high covering power and high correction for the various lens aberrations including spherical aberration, chromatic aberration, lateral color, curvature of field, astigmatism, sine condition, coma, distortion, Petzval condition, ghost images, vignetting and flare.

Specifically it is an object of the invention to provide an f/2.0 or f/1.9 lens covering up to 22° or in one embodiment covering 15° with extremely flat field. A lens according to the invention has exceptionally fine rim ray agreement.

Lenses may be divided into certain types which in general are readily recognized by the lens designer although in a few rare border line cases it is perhaps a little difficult to state definitely to just what class a lens belongs. The present invention is however quite definitely related to a known type of lens namely that having four components the outer two of which are positive and usually but not always single elements and the two inner ones are high meniscus concave to the diaphragm therebetween. These two inner components are usually compound, and the present invention is equally applicable whether each of these components is of the usual simple doublet or whether either or both are more complex. Lenses of this type are also known in which one or more of the four air spaced components also includes an air space as shown in U. S. 1,839,011, Bielicke, U. S. 2,019,985, Lee, U. S. 2,012,822, Lee and German 665,520, Laack. The invention may be combined with those of my co-pending applications Serial Numbers 335,782 and 335,784 filed concurrently herewith and with those of Herzberger described in application Serial Number 335,785 and of Frederick and Herzberger described in application Serial No. 335,784 both of which were also filed concurrently herewith.

The present invention is concerned primarily with the improvement in rim ray agreement and also results in a flatter field without any loss in quality with respect to the other aberrations. This improvement is accomplished by putting a cemented surface in the front component with a refractive index difference, sometimes called index break, from high to low of more than .05 and preferably of about .1. This cemented surface corrects the rim ray agreement particularly the upper rim ray without spoiling the correction for spherical aberration or lower rim ray. The said cemented surface should be substantially plano and in no case should go negative to a radius value less than $-1.5F$ (where F is the focal length of the objective) because this condition introduces undercorrection of spherical aberration and causes the lower rim ray correction to go too highly positive. On the other hand, especially if the rear element at this cemented surface is a positive one, the radius can go positive down to $.75F$.

This latter modification is particularly useful in motion picture lenses where the covering power required is less and improvement in field flatness is particularly desirable. The cemented surface in this case provides a relatively sensitive control of spherical aberration as well as rim rays without much effect on color provided suitable glasses are selected.

In every case the selection of proper glasses i. e. the selection of refractive index break (difference in indexes at the refractive surface) and of the curvature of the cemented surface to correct rim rays permits increased Petzval radius and flatter field without introducing distortion, color, or other aberrations and thus the advantages of the invention are twofold.

Figure 1:
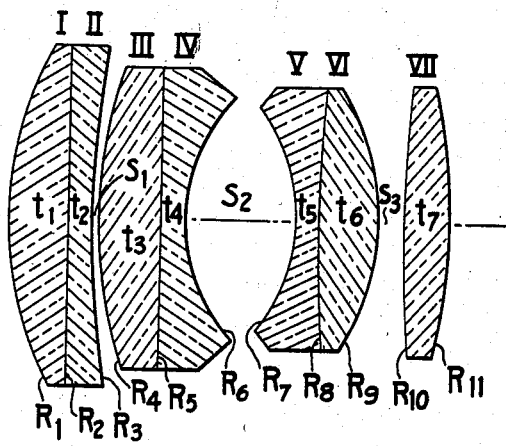
Fig. 1 shows one embodiment of the invention.

The specifications corresponding to the accompanying drawings are as follows:

*Fig. 1*

F=100 mm.   f/1.9

| Lens | Glass | | Radii | Spacings |
|---|---|---|---|---|
|  | $N_D$ | $\nu$ |  |  |
| I | 1.611 | 57.2 | $R_1=+53.7$ mm. | $t_1=9.6$ mm. |
| II | 1.525 | 51.3 | $R_2=\infty$ | $t_2=3.2$ |
|  |  |  | $R_3=+150.3$ | $s_1=.9$ |
| III | 1.611 | 58.8 | $R_4=+42.6$ | $t_3=9.5$ |
| IV | 1.575 | 41.4 | $R_5=\infty$ | $t_4=3.7$ |
|  |  |  | $R_6=+26.0$ | $s_2=17.4$ |
|  |  |  | $R_7=-27.4$ |  |
| V | 1.575 | 41.4 | $R_8=+214.2$ | $t_5=3.6$ |
| VI | 1.620 | 60.4 | $R_9=-36.4$ | $t_6=9.1$ |
|  |  |  | $R_{10}=+286.2$ | $s_3=4.0$ |
| VII | 1.620 | 60.4 | $R_{11}=-87.2$ | $t_7=7.8$ |

Fig. 2

| Lens | Glass | | Radii | Spacings |
|---|---|---|---|---|
| | $N_D$ | $\nu$ | | |
| | | | F=100 mm. | f/1.9 |
| I | 1.617 | 55.0 | $R_1=+58.3$ mm. | $t_1=5.4$ mm. |
| II | 1.500 | 61.8 | $R_2=+103.2$ | $t_2=4.5$ |
| | | | $R_3=+345.0$ | $s_1=.4$ |
| III | 1.620 | 60.4 | $R_4=+44.0$ | $t_3=10.9$ |
| IV | 1.563 | 42.9 | $R_5=\infty$ | $t_4=3.7$ |
| | | | $R_6=+24.7$ | $s_2=17.3$ |
| V | 1.605 | 38.2 | $R_7=-25.7$ | $t_5=3.6$ |
| VI | 1.639 | 55.5 | $R_8=+320.4$ | $t_6=12.1$ |
| | | | $R_9=-38.2$ | $s_3=.4$ |
| VII | 1.620 | 60.4 | $R_{10}=\infty$ | $t_7=7.8$ |
| | | | $R_{11}=-57.3$ | |

In lenses of this general type it has been customary to form the front component of a single element with a front surface whose radius $R_1$ is (between $+.3F$ and $1.2F$) usually between $.6F$ and $.9F$ and a rear surface corresponding to $R_3$ in the above table between $-2F$ and $+.3F$ usually between infinity and $+1.5F$. It will be noticed that the rear surface of this component of the present lens follows the usual rules but the front surface is a little more curved than is usual but not more curved than is known. The invention is primarily in the introduction, type, and arrangement of the cemented surface in this front component.

The other components may be of any form used in lenses of this type. In these known lenses, the surface corresponding to $R_4$ above usually have radii between $.3F$ and $.5F$, those corresponding to $R_5$ being between $-.5F$ and $+.5F$, those corresponding to $R_6$ being between $.2F$ and $.4F$, those corresponding to $R_7$ being between $-.2F$ and $-.4F$, those corresponding to $R_8$ being between $-F$ and $+.5F$, those corresponding to $R_9$ being between $-.6F$ and $-.2F$, those corresponding to $R_{10}$ being between $-1.5F$ and $+.5F$, and those corresponding to $R_{11}$ i. e. the rear surface being between $-.5F$ and infinity. Thus, the invention is applicable to practically any lens of this general type and consists of the front component including a cemented surface with an index break of more than .05 from a high index positive front element to a lower index element subsequent to that front element and with a radius of curvature between $-1.5F$ and $+.75F$.

Figure 2:
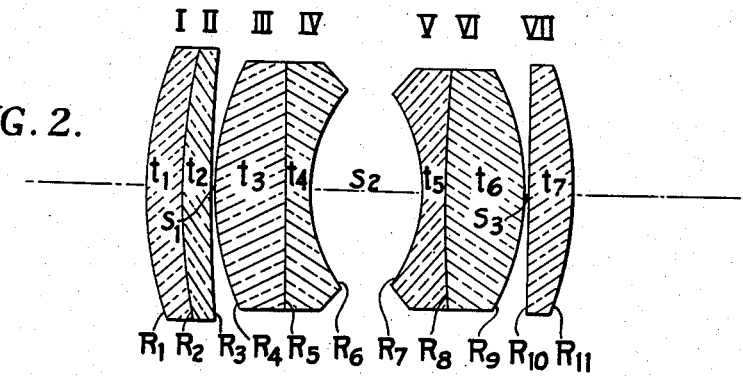
Fig. 2 shows another embodiment of the invention.

In the species of the invention shown in Fig. 1 the front component consists of a doublet with a positive front element and a negative rear one. In this case, the cemented surface is plano or substantially so and the dispersive index of element I is at least 5 greater than that of element II. In the other species shown (Fig. 2) both elements are positive, $R_2$ is preferably between $.75F$ and $R_3$ which may in this species be generally a little flatter than in the case of Fig. 1. Also, in Fig. 2, the dispersive index of lens I is less than that of lens II by at least 5.

Having thus described two preferred embodiments of my invention and compared the invention exactly with known lenses in order to point out the novel features which provide the improved rim ray agreement and field flatness, I wish to point out the invention is not limited to these constructions but is of the scope of the appended claims.

What I claim and desire to secure by Letters Patent of the United States is:

1. A high aperture objective of the type having four components separated by air and axially aligned of which the two outer ones are positive and the two inner ones are compound menisci highly concave toward a diaphragm therebetween, characterized by the front component consisting of a doublet having a positive front element whose index of refraction is at least .05 greater than that of the second element, the front surface being convex to the front and having a radius of curvature between $.4F$ and $F$ where $F$ is the focal length of the objective, the cemented surface having a weak radius of curvature between $-1.5F$ and $+.75F$ where the minus and plus signs indicate concavity and convexity respectively to the front and the rear surface being plano or convex to the front with a radius of curvature greater than $F$.

2. A high aperture objective comprising four components separated by air and axially aligned, the front three being doublets and the rear one a single element, the front element of the front component being positive and having an index of refraction of at least .05 greater than that of the rear element of this front component and the radii of curvature of the refractive surfaces numbered consecutively $R_1$ to $R_{11}$ from the front to the rear being as follows, $R_1$ between $.4F$ and $F$ where $F$ is the focal length of the objective, $R_2$ between $-1.5F$ and $+.75F$, $R_3$ greater than $F$, $R_4$ between $.3F$ and $.5F$, $R_5$ between $-.5F$ and $+.5F$, $R_6$ between $.2F$ and $.4F$, $R_7$ between $-.2F$ and $-.4F$, $R_8$ between $-F$ and $+.5F$, $R_9$ between $-.6F$ and $-.2F$, $R_{10}$ between $-1.5F$ and $+.5F$, and $R_{11}$ between $-.5F$ and infinity where the minus and plus signs indicate concavity and convexity respectively to the front.

3. A high aperture objective of the type having four components separated by air and axially aligned of which the two outer ones are positive and the two inner ones are compound menisci highly concave toward a diaphragm therebetween characterized by the front component including a cemented surface with a refractive index break of more than .05 from a high index positive front element to a lower index subsequent element and with a radius of curvature between $-1.5F$ and $+F$ where $F$ is the focal length of the objective and the minus and plus signs indicate concavity and convexity respectively to the front.

4. A high aperture objective according to claim 3 in which the cemented surface of the front component is substantially plano.

5. A high aperture objective of the type having four components separated by air and axially aligned of which the two outer ones are positive and the two inner ones are compound menisci highly concave toward a diaphragm therebetween characterized by the front component being a doublet with a positive front element whose index of refraction is at least .05 greater than that of the rear element of the doublet, the radius of curvature of the front surface of this doublet being between $.5F$ and $.7F$, the radius of curvature of the rear surface of this doublet being between $F$ and $5F$, and the radius of curvature of the cemented surface of this doublet being between $-1.5F$ and $+.75F$ where $F$ is the focal length of the objective and the minus and plus signs indicate concavity and convexity respectively to the front.

6. A high aperture objective of the type having four components separated by air and axially aligned of which the two outer ones are positive and the two inner ones are compound menisci highly concave toward a diaphragm therebetween characterized by the front component being a doublet with a positive front element whose index of refraction is at least .05 greater than that of the rear element of the doublet, and whose dispersive index is at least 5 greater than that of the rear element which is a negative element, the front surface of the doublet being convex to the front and having a radius of curvature between .5F and .7F, the radius of curvature of the cemented surface of this doublet being substantially plano and the rear surface of this doublet being convex to the front and having a radius of curvature between F and 5F where F is the focal length of the objective.

7. A high aperture objective of the type having four components separated by air and axially aligned of which the two outer ones are positive and the two inner ones are compound menisci highly concave toward a diaphragm therebetween characterized by the front component being a doublet with a positive front element whose index of refraction is at least .05 greater than that of the rear element of the doublet and whose dispersive index is at least 5 less than that of the rear element which is a positive element, the front surface of this doublet being convex to the front and having a radius of curvature between .5F and .7F, the cemented surface of this doublet being convex to the front and having a radius of curvature between .75F and that of the rear surface of this doublet which is also convex to the front and has a radius of curvature between F and infinity where F is the focal length of the objective.

GEORGE H. AKLIN.